A. E. POWELL.
TIRE SHOE.
APPLICATION FILED JULY 11, 1916.
1,213,410. Patented Jan. 23, 1917.
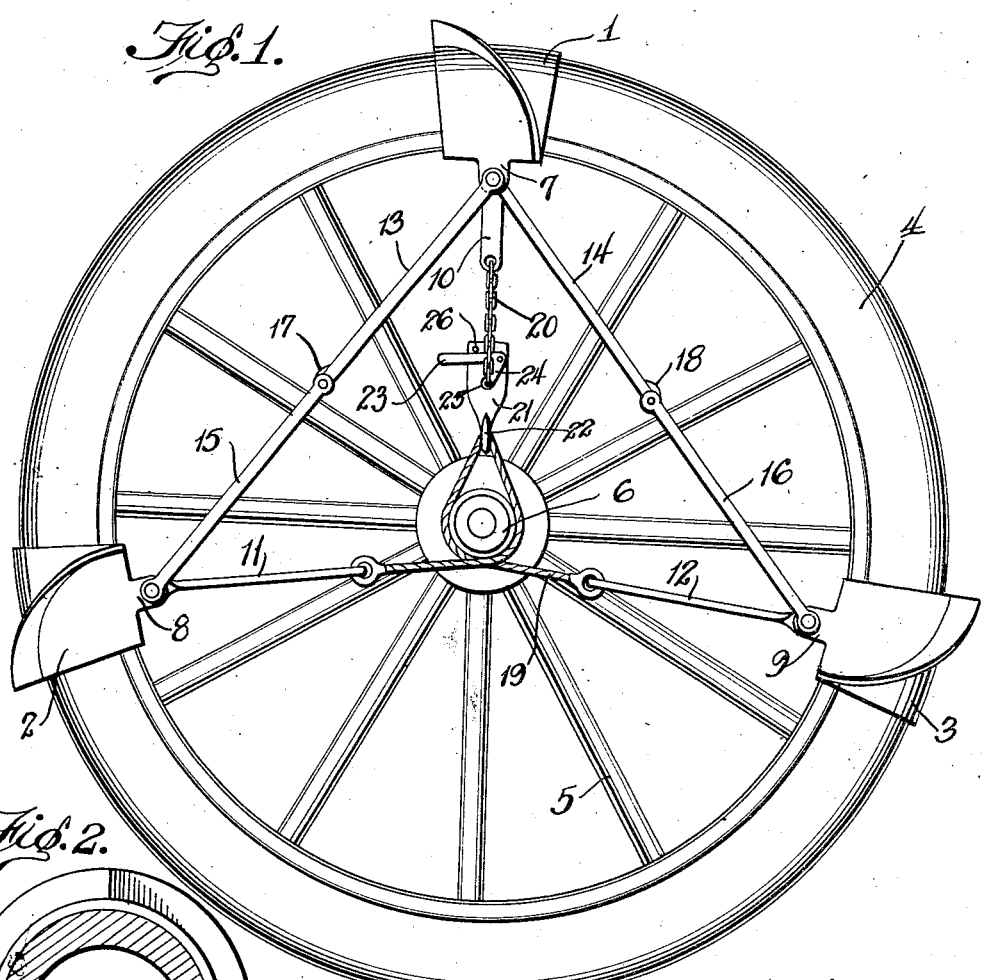
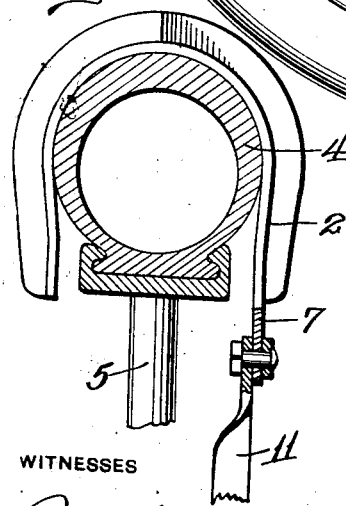
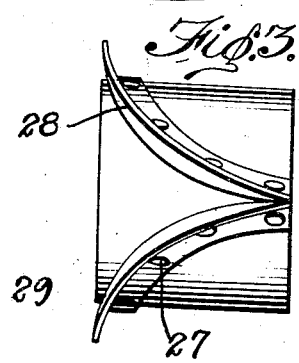
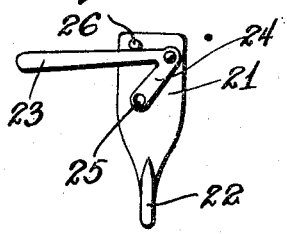
WITNESSES
INVENTOR
Ambrose E. Powell
BY Richard B. Owen
ATTORNEY

UNITED STATES PATENT OFFICE.

AMBROSE E. POWELL, OF CARON, SASKATCHEWAN, CANADA.

TIRE-SHOE.

1,213,410.  Specification of Letters Patent.  Patented Jan. 23, 1917.

Application filed July 11, 1916. Serial No. 108,744.

*To all whom it may concern:*

Be it known that I, AMBROSE E. POWELL, a subject of the King of Great Britain, residing at Caron, in the Province of Saskatchewan and Dominion of Canada, have invented certain new and useful Improvements in Tire-Shoes, of which the following is a specification.

This invention relates to an improvement in shoes for tires, and more particularly to a structure which is adapted to be fitted over a wheel and tire when the motor vehicle or other machine of which the wheel is a part is traveling in the mud or is set in the mud in such a way that the traction wheels slip without giving the proper driving power.

An object of my invention is to provide a device as described which can be attached to the wheel and tire to be used in traveling through mud, or which may be fitted in place after the vehicle has stopped and even when the wheel is in the mud up to the axle, the parts being so arranged that the device may even be fitted in place by an operator standing upon the running board of the vehicle and the securing means may be manipulated with one hand.

A further object lies in so constructing the device that several individual shoes are mounted at various points around the periphery of the tire to thus distribute the driving strain and each of the several shoes will be given support by being braced from the remaining shoes.

A still further object is to so construct the securing means that the device may be fitted to be used upon wheels and tires of various sizes and when not in use may be folded to occupy a comparatively small compass so that it can be packed or stored under a seat or in a tool box and can thus be conveniently carried.

With the above and other objects in view, my invention consists in certain novel features of construction and combinations of parts which will be hereinafter set forth in connection with the drawings and then more particularly pointed out in the claims.

In the drawings, Figure 1 is a view in side elevation of a wheel and tire having the device of my invention fitted in place thereon. Fig. 2 is a transverse sectional view through the wheel rim and the tire showing in greater detail one of the mud shoes. Fig. 3 is a plan view of one of the shoes to better illustrate the arrangement of the cleats thereon. Fig. 4 is an enlarged detail view showing the means for tightening the device in the operative relation and by which the adjustment for the various sizes of tires is secured.

The three mud shoes 1, 2 and 3 are each of substantially the same form, and as is better shown in Fig. 2, these mud shoes are shaped to be in cross section substantially U-shaped so that they can be readily fitted over and removed from the tire and wheel. The tire 4 and the wheel 5 are of the usual construction, the wheel being so built that the hub 6 extends outwardly slightly from the plane of the outer side of the tire and rim, as in the usual wheels as now built into automobile or motor vehicle constructions. The substantially U-shaped portion of the members 1, 2 and 3 is constructed to have the two arms thereof of substantially the same length and made sufficiently long that it will extend down and adjacent to the side edges of the rim, and one of these arms of each of the members has the bearing ears 7, 8, and 9, as better shown in Fig. 1.

Links 10, 11, and 12 are connected pivotally with the bearing ear 7, 8 and 9, and at their free ends are provided with open loops or eyes. Brace arms 13 and 14 are hingedly connected with the bearing ear 7 and extend to each side in a spread relation, and similar brace arms 15 and 16 are connected with the bearing ears 8 and 9 and at their free ends are hingedly connected with the free ends of the arms 13 and 14 respectively. It is preferable that stop lugs 17 and 18 be provided upon the brace arms so that the swinging movement thereof in the opening relation will be limited to hold the two connected arms of each pair in alinement when brought to their full open position.

A flexible cable 19 is connected at its ends with the ends of the links 11 and 12 and in its central portion is looped as shown in Fig. 1, and a chain 20, having open links, is connected with the free end of the link 10. In the use of the device, it is the intention that the shoes shall be held against the tire by tension exerted upon the several shoes through the chain 20 and the loop of the cable 19, and also it is desired that adjustment may be made along the length of the chain to allow fitting of the device on tires of various sizes, and to accomplish this result, I provide the plate 21 with the hooked end 22 to be caught through the loop of the cable 19. At its upper end, this plate 21 has a lever 23 pivotally mounted and an arm 24 of this lever has a pin 25 thereon. The pin 25 is fitted through one of the links of the chain 20 in the use of this clamping device, and then by manipulating the handle 23, the entire lever structure is swung to the position shown in Fig. 4 and as the pin 25 has swung past the dead center with respect to the pivotal mounting of the lever 23, the parts will be held against casual back swinging, and in this connection a stop lug 26 is mounted on the plate 21 to prevent excessive swinging movement of the lever 23.

It is preferable that the mud shoes 1, 2 and 3 have extended cleat or flange portions, and as is better illustrated in Fig. 3, these cleats are preferably made of short lengths of angle iron bent to the proper shape and secured to the U-shaped portion of the shoes by means of rivets 27. As is here illustrated, a pair of cleats 28 and 29 is mounted on each of the mud shoes and these cleats are so arranged that at the points of disposition over the center of the tire they come together and then are extended in a divergent relation to and over the sides of the shoes. It is preferable that the cleats be disposed as shown in Fig. 3 as by mounting the cleats in this manner and placing the attachment on the tire in such a position that the adjacent ends of the cleats are disposed to initially contact with the surface of the road, the structure will be practically self cleaning, and also the cleats will exert a very efficient holding action.

In the use of the device, the shoe 1 will be placed over the tire on the upper portion thereof and by extending the brace arms 13 and 15, and 14 and 16, the shoes 2 and 3 will be disposed at proper points to be received over the tire at points slightly below a horizontal line taken through the center of the axle, thus permitting fitting of the device when the wheel is sunk deeply in the mud. The loop of the cable 19 is then fitted around the hub 6 so that the two ends bear against the lower side of the hub and the hook 22 is inserted through the loop after which the chain 20 has one of the links thereof fitted over the pin 25 on the arm 24, it of course being understood that the lever 23 has been swung around its pivotal mounting on the plate 21 to a position that the arm 24 extends vertically upwardly or in line with the longitudinal extent of the plate, and then by exerting force against the lever 23 to swing the same to the position shown in Fig. 4, the cable 19 will be tightened around the hub and tension will be exerted on the chain 20 to thus bring each of the mud shoes to a proper and close fitting bearing against the tire. Under some circumstances there might be a tendency for the shoes 2 and 3 to be displaced through being swung toward the shoe 1, however, the brace structures arranged between the shoes 2 and 3 and the shoe 1 will hold these shoes against displacement in either direction and thus the entire device will be rigidly secured in place. When it is desired to remove the structure from the fitting over the tire, the lever 23 is swung around its pivotal mounting on the plate 21 and this relieves the tension against the loop of the cable 19 and also against the chain 20 which will allow loosening of the chain from the pin or stud 25 and then the loop of the cable 19 can be removed from the hub 6 and the remaining parts can be readily withdrawn from their fitted positions over the tire after which the brace structure may be folded at its hinged joints and the entire structure will then present a comparatively small bulk which can be readily carried and stored.

While I have herein shown and described only one specific form of the device, it will be understood that the form and the manner of connecting the cleats with the mud shoes might be varied, that the brace structure could be constructed and mounted in other manners than shown, that the tightening means might be varied, and that other changes and modifications might be resorted to in the form and arrangement of the parts without departing from the spirit and scope of my invention, and hence I do not wish to be limited to the exact disclosure but only to such points as may be set forth in the claims.

I claim:

1. A mud shoe for wheels comprising a plurality of shoe members to be mounted over the tread at spaced apart points, means to be connected with the hub of the wheel and by which the shoes are secured in the proper mounting, means by which adjustment of the parts may be made to adapt the device for use upon wheels of various sizes, and braces connected with one of said shoes and extended to the remaining shoes to hold the several shoes against displacement from the operative mounting.

2. A mud shoe for wheels comprising a plurality of shoe members shaped to be received over a tire mounted on said wheels, cleats carried by said shoes, securing means extended from each of said shoes, clamping means by which the securing means can be drawn in to mount the shoes in the proper positions on and hold the same secured to the tire, and braces connected between said shoes to hold the same against displacement from their relative positioning and from the tire.

3. A mud shoe for wheels comprising a plurality of shoe members shaped to be received and fitted over a tire mounted on said wheel, a cable connected with certain of said shoes to be looped around the hub of the wheel, a securing clamp structure to be connected in said loop, and means by which the clamp structure is connected with another of said shoes in such relation that as the clamp structure is brought to the operative relation the several shoes will be drawn against the tire.

4. A mud shoe for wheels comprising a plurality of shoe members shaped to be received and fitted over a tire mounted on said wheel, a cable connected with certain of said shoes to be looped around the hub of the wheel, a securing clamp structure to be connected in said loop, means by which the clamp structure is connected with another of said shoes in such relation that as the clamp structure is brought to the operative relation the several shoes will be drawn against the tire, and folding brace members connected between said last named shoe and the remaining shoes to hold the several shoes against displacement.

In testimony whereof I affix my signature in presence of two witnesses.

AMBROSE E. POWELL.

Witnesses:
MARGARET ROYCE,
JAMES FRANKLIN BOYLAN.